(12) United States Patent
Kim (10) Patent No.: US 7,852,104 B2
(45) Date of Patent: Dec. 14, 2010

(54) LIQUID CRYSTAL DISPLAY DEVICE AND TESTING METHOD THEREOF

(75) Inventor: Kyung Hwan Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 218 days.

(21) Appl. No.: 11/984,955

(22) Filed: Nov. 26, 2007

(65) Prior Publication Data

US 2008/0129327 A1      Jun. 5, 2008

(30) Foreign Application Priority Data

Nov. 30, 2006   (KR) ...................... 10-2006-0119547

(51) Int. Cl.
*G01R 31/00*   (2006.01)
(52) U.S. Cl. .................................... 324/770
(58) Field of Classification Search ............ None
See application file for complete search history.

(56) References Cited

U.S. PATENT DOCUMENTS

| | | | |
|---|---|---|---|
| 5,576,730 A * | 11/1996 | Shimada et al. | 345/98 |
| 6,784,862 B2 * | 8/2004 | Kodate et al. | 345/92 |
| 6,882,397 B2 * | 4/2005 | Hayata et al. | 349/149 |
| 7,038,484 B2 * | 5/2006 | Harada et al. | 324/770 |
| 7,298,164 B2 * | 11/2007 | Chen et al. | 324/770 |
| 7,439,756 B2 * | 10/2008 | Lai | 324/770 |
| 7,525,335 B2 * | 4/2009 | Ootaguro et al. | 324/770 |
| 2003/0090614 A1 * | 5/2003 | Kim et al. | 349/149 |
| 2004/0046920 A1 * | 3/2004 | Hayata et al. | 349/149 |
| 2006/0103412 A1 * | 5/2006 | Kimura et al. | 324/770 |

FOREIGN PATENT DOCUMENTS

JP     2004-102260 A     4/2004

* cited by examiner

*Primary Examiner*—Paresh Patel
(74) *Attorney, Agent, or Firm*—Morgan, Lewis & Bockius LLP (57) ABSTRACT

A liquid crystal display device and a testing method thereof is disclosed, which is suitable for improving reliability on testing process, the liquid crystal display device comprising an image display unit divided into a plurality of blocks; a plurality of test pad groups corresponding to the plurality of blocks, respectively; and a plurality of test transistor groups to supply test signals supplied to the plurality of test pad groups to a plurality of liquid crystal cells, wherein the plurality of test transistor groups are formed of a test transistor to independently switch the corresponding liquid crystal cells divided for realizing the same color.

10 Claims, 6 Drawing Sheets

LIQUID CRYSTAL DISPLAY DEVICE AND TESTING METHOD THEREOF

This application claims the benefit of Korean Patent Application No. 2006-119547 filed Nov. 30, 2006, which is hereby incorporated by reference as if fully set forth herein.

BACKGROUND OF THE INVENTION

1. Field of the Invention

The present invention relates to a liquid crystal display device and a testing method thereof, and more particularly, to a liquid crystal display device and a testing method thereof, which is suitable for improving reliability on testing process.

2. Discussion of the Related Art

In general, a liquid crystal display device displays desired images by controlling light transmittance in liquid crystal cells arranged in a matrix configuration on a liquid crystal display panel according to a video signal.

The liquid crystal display panel is comprised of a thin film transistor substrate, a color filter substrate, and a liquid crystal layer, wherein the two substrates are bonded to each other by a sealant in state of providing the liquid crystal layer interposed therebetween.

The color filter substrate is provided with a color filter array on an upper substrate, wherein the color filter array includes a black matrix to prevent light leakage; a color filter to realize color images; a common electrode to form a vertical electric field with pixel electrode; and an upper alignment film coated thereon so as to align liquid crystal molecules. Also, the thin film transistor substrate is provided with a thin film transistor array on a lower substrate, wherein the thin film transistor array includes a plurality of gate lines; a plurality of data lines, each data line crossing each gate line; a plurality of thin film transistors TFTs, each thin film transistor TFT formed adjacent to each crossing portion of the gate and data lines; a pixel electrode connected to the thin film transistor TFT; and a lower alignment film coated thereon so as to align the liquid crystal molecules.

The method of fabricating the liquid crystal display panel includes a patterning process for forming the thin film transistor array and the color filter array; a bonding process for bonding the thin film transistor substrate and the color filter substrate to each other in state of providing the liquid crystal layer therebetween; and a testing process for detecting the defective liquid crystal display panel.

Through the testing process, it is tested whether the liquid crystal display panel is defective or not before a drive integrated circuit is adhered to the liquid crystal display panel. In more particular, the liquid crystal display panel is loaded to a testing apparatus which is maintained under the circumstances identical to those for a liquid crystal display module of finished product into which a backlight unit and drive integrated circuit are assembled. After loading the liquid crystal display device to the testing apparatus, a test signal which is identical to a driving signal applied when driving the liquid crystal display module is applied to the liquid crystal display panel, whereby the image is displayed on the liquid crystal display panel. At this time, if there is a defective signal line in the liquid crystal display panel being loaded to the testing apparatus, the pixel connected to the defective signal line displays the different image from that of the pixel connected to the normal signal line. Accordingly, a worker can recognize the defectiveness in the liquid crystal display panel.

To supply the test signal to the signal line on the testing process, signal pads connected to the signal lines are respectively connected to the probe pin by one-to-one correspondence. However, since the signal pads are increased in number due to the large-sized liquid crystal display panel, particles may occur, the probe pin may be damaged, or the misalignment may occur between the signal pads and the probe pin.

SUMMARY OF THE INVENTION

Accordingly, the present invention is directed to a liquid crystal display device and a testing method thereof that substantially obviates one or more problems due to limitations and disadvantages of the related art.

An object of the present invention is to provide a liquid crystal display device and a testing method thereof, which is suitable for improving reliability on testing process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises an image display unit divided into a plurality of blocks; a plurality of test pad groups corresponding to the plurality of blocks, respectively; and a plurality of test transistor groups to supply test signals supplied to the plurality of test pad groups to a plurality of liquid crystal cells, wherein the plurality of test transistor groups are formed of a test transistor to independently switch the corresponding liquid crystal cells divided for realizing the same color.

The plurality of test transistor groups comprise a first test transistor connected to signal lines corresponding to the liquid crystal cells for realizing a red color of each of the blocks; a second test transistor connected to signal lines corresponding to the liquid crystal cells for realizing a green color of each of the blocks; and a third test transistor connected to signal lines corresponding to the liquid crystal cells for realizing a blue color of each of the blocks.

The plurality of test pad groups comprise first to third test control pads to supply test control signals to the first to third test transistors, respectively; and first to third test data pads to supply test data signals to the first to third test transistors, respectively.

In addition, the liquid crystal display device includes first to third test control lines to connect the first to third test transistors with the first to third test control pads, respectively, by each of the blocks; and first to third test data lines to connect the first to third test transistors with the first to third test data pads, respectively, by each of the blocks.

Also, the signal pads connected to the signal lines in the image display unit are formed at one side of the image display unit with the plurality of test pad groups, and the plurality of test pad groups are formed at the remaining area of the image display unit where the signal pads are not provided thereon.

Also, the signal pads connected to the signal lines in the image display unit are formed at one side of the image display unit, and the plurality of test pad groups are formed at the other side of the image display unit.

In another aspect, a testing method of liquid crystal display device comprises preparing a liquid crystal display device including an image display unit divided into a plurality of blocks, a plurality of test pad groups corresponding to the plurality of blocks respectively, and a plurality of test transistor groups to supply test signals supplied to the plurality of test pad groups to a plurality of liquid crystal cells; supplying the corresponding test signals to the plurality of test pad groups; and testing whether the liquid crystal cells are defective or not with the use of the plurality of test transistor groups respectively connected to the plurality of test pad groups, wherein testing whether the liquid crystal cells are defective or not comprises performing a test using the plurality of test transistor groups comprised of a test transistor to independently switch the corresponding liquid crystal cells divided for realizing the same color.

Also, testing whether the liquid crystal cells are defective or not comprises checking whether the liquid crystal cells for realizing a red color of each of the blocks are defective or not by using a first test transistor included in each of the plurality of test transistor groups; checking whether the liquid crystal cells for realizing a green color of each of the blocks are defective or not by using a second test transistor included in each of the plurality of test transistor groups; and checking whether the liquid crystal cells for realizing a blue color of each of the blocks are defective or not by using a third test transistor included in each of the plurality of test transistor groups.

Also, checking whether the liquid crystal cells for realizing the red color of each of the blocks are defective or not comprises supplying a test control signal to a gate electrode of the first test transistor through a first test control pad and a first test control line formed by each of the blocks; and supplying a test data signal to a source electrode of the first test transistor through a first test data pad and a first test data line formed by each of the blocks.

Also, checking whether the liquid crystal cells for realizing the green color of each of the blocks are defective or not comprises supplying a test control signal to a gate electrode of the second test transistor through a second test control pad and a second test control line formed by each of the blocks; and supplying a test data signal to a source electrode of the second test transistor through a second test data pad and a second test data line formed by each of the blocks.

Also, checking whether the liquid crystal cells for realizing the blue color of each of the blocks are defective or not comprises supplying a test control signal to a gate electrode of the third test transistor through a third test control pad and a third test control line formed by each of the blocks; and supplying a test data signal to a source electrode of the third test transistor through a third test data pad and a third test data line formed by each of the blocks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display device according to a preferred embodiment of the present invention and a testing method thereof will be explained with reference to the accompanying drawings.

Figure 1:
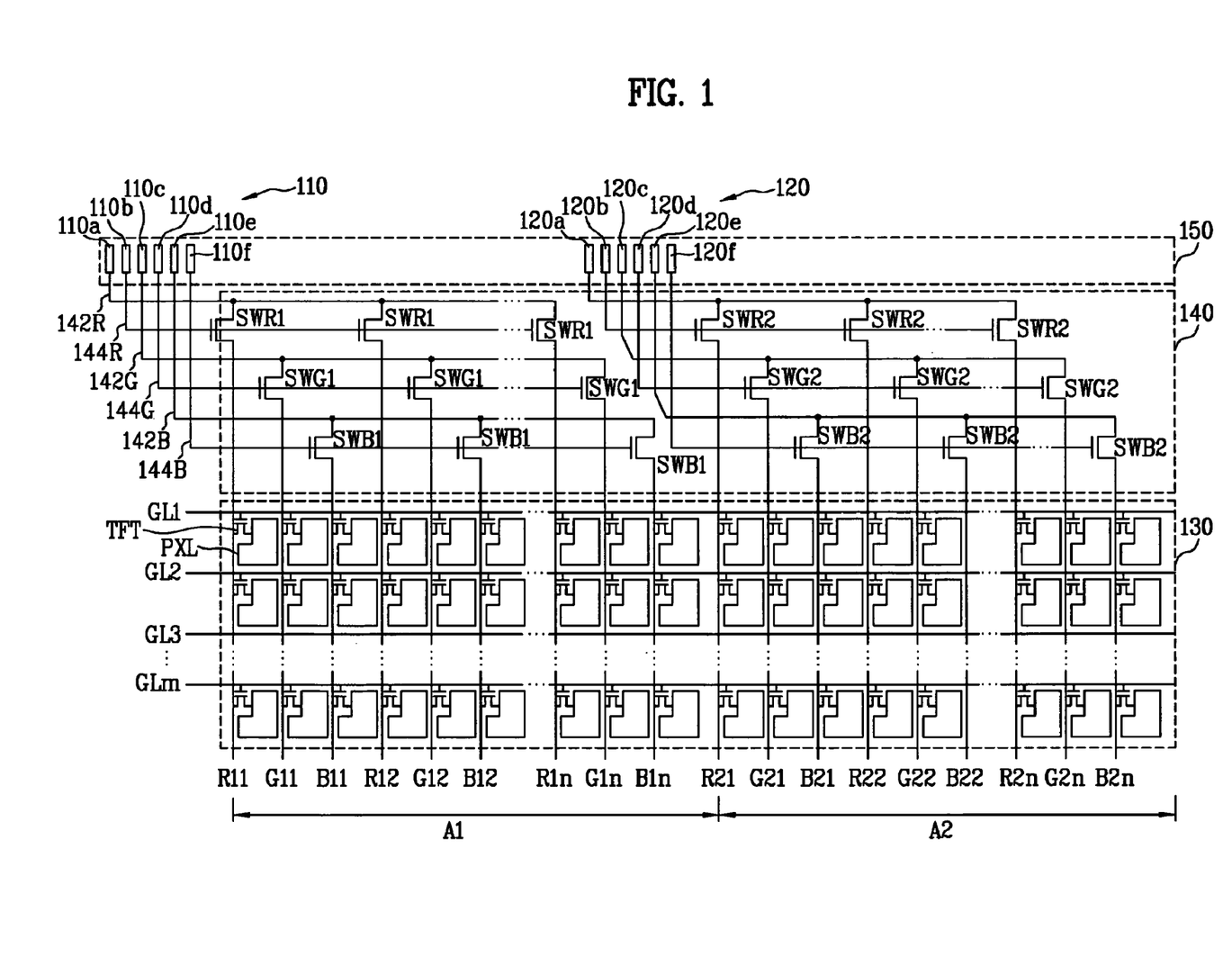
FIG. 1 is a diagram of illustrating a liquid crystal display device according to the present invention.

FIG. 1 is a diagram of illustrating a liquid crystal display device according to the present invention. As shown in FIG. 1, the liquid crystal display device according to the present invention includes an image display unit 130, a signal pad unit 150 to supply a signal to the image display unit 130, and a test circuit unit 140 to test the image display unit 130.

The image display unit 130 is provided with a plurality of gate lines GL1 to GLm; a plurality of data lines R11 to B2n; a plurality of thin film transistors TFTs, each thin film transistor formed adjacent to each crossing of the gate and data lines; and a plurality of pixel electrodes PXL connected to the thin film transistors TFTs, respectively. Each of the gate lines GL is supplied with a scan pulse through a gate driver (not shown). Each of the data lines R11 to B2n is supplied with a pixel voltage signal of an analog type through a data driver (not shown). The image display unit 130 is divided into a plurality of blocks. On testing, each of the blocks is supplied with a test signal through the corresponding test circuit unit 140. Herein, the case of dividing the image display unit 130 into the two blocks A1, A2 is exemplary explained as follows.

Figure 2:
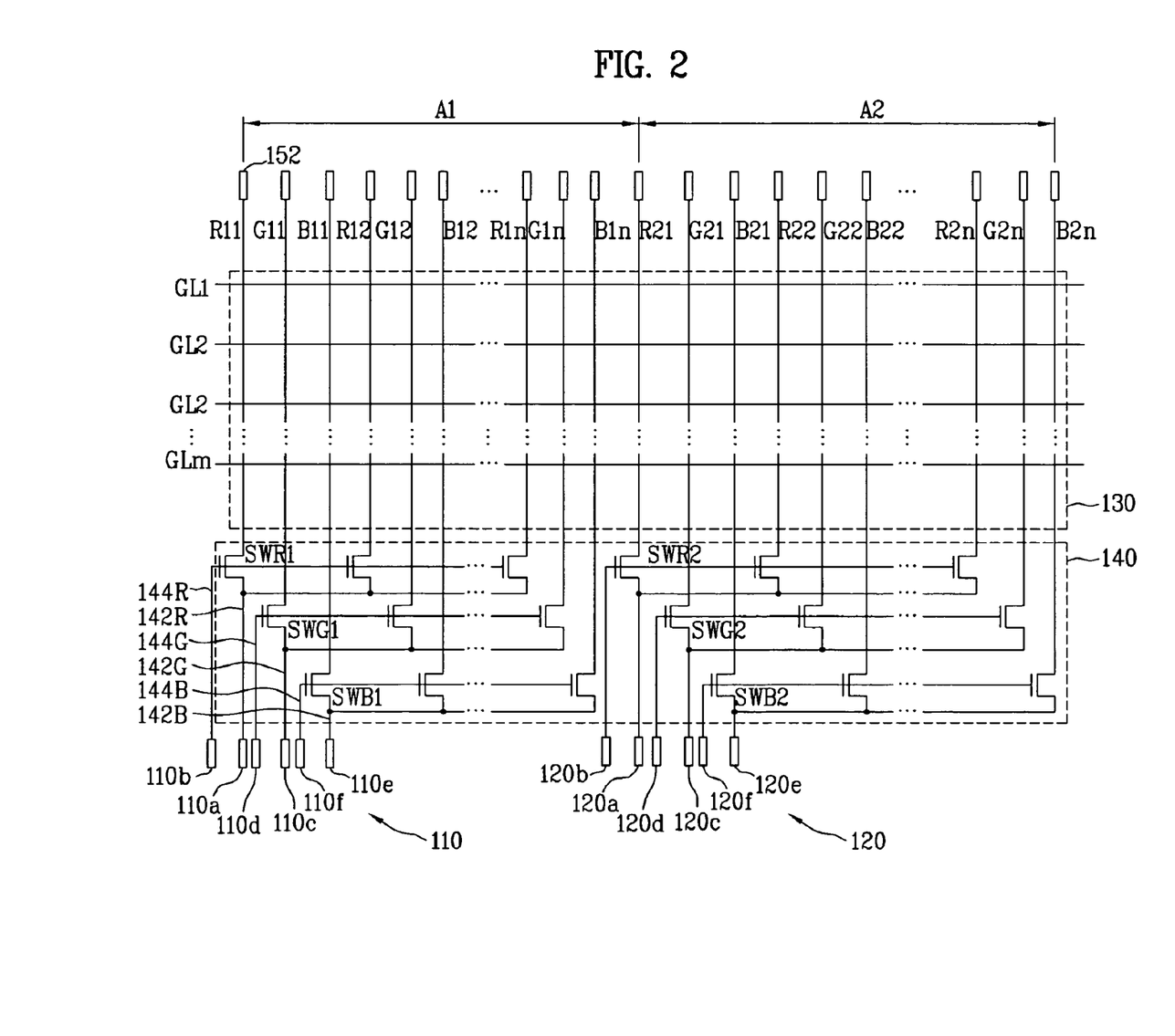
FIG. 2 is a diagram of illustrating another shapes of test pad groups and test circuits shown in FIG. 1.

The signal pad unit 150 is provided with signal pads (not shown) which are connected to at least any one signal line among the gate lines GL1 to GLm and the data lines R11 to B2n. On the remaining area of the signal pad unit 150 without the signal pads, there are a first test pad group 110 corresponding to the first block A1 of the image display unit 130, and a second test pad group 120 corresponding to the second block A2 of the image display unit 130. The first and second test pad groups 110 and 120 are formed at a lower side with respect to the image display unit 130. In more detail, the first and second test pad groups 110 and 120 are formed in opposite to signal pads 152 positioned at an upper side with respect to the image display unit 130, as shown in FIG. 2.

The first and second test pad groups 110 and 120 include test control pads 110b, 110d, 110f, 120b, 120d, 120f and test data pads 110a, 110c, 110e, 120a, 120c, 120e. The test control pads 110b, 110d, 110f, 120b, 120d, 120f supply control signals to test transistors SWR, SWG, SWB connected to red, green and blue liquid crystal cells through test control lines 144R, 144G, 144B, respectively. The test data pads 110a, 110c, 110e, 120a, 120c, 120e supply the test signals to the test transistors SWR, SWG, SWB through test data lines 142R, 142G, 142B. The test control pads 110b, 110d, 100f, 120b, 120d, 120f and test data pads 110a, 110c, 110e, 120a, 120c, 120e are supplied with the control signals and test signals through a probe pin 162 fixed to a probe body 164.

Figure 3:
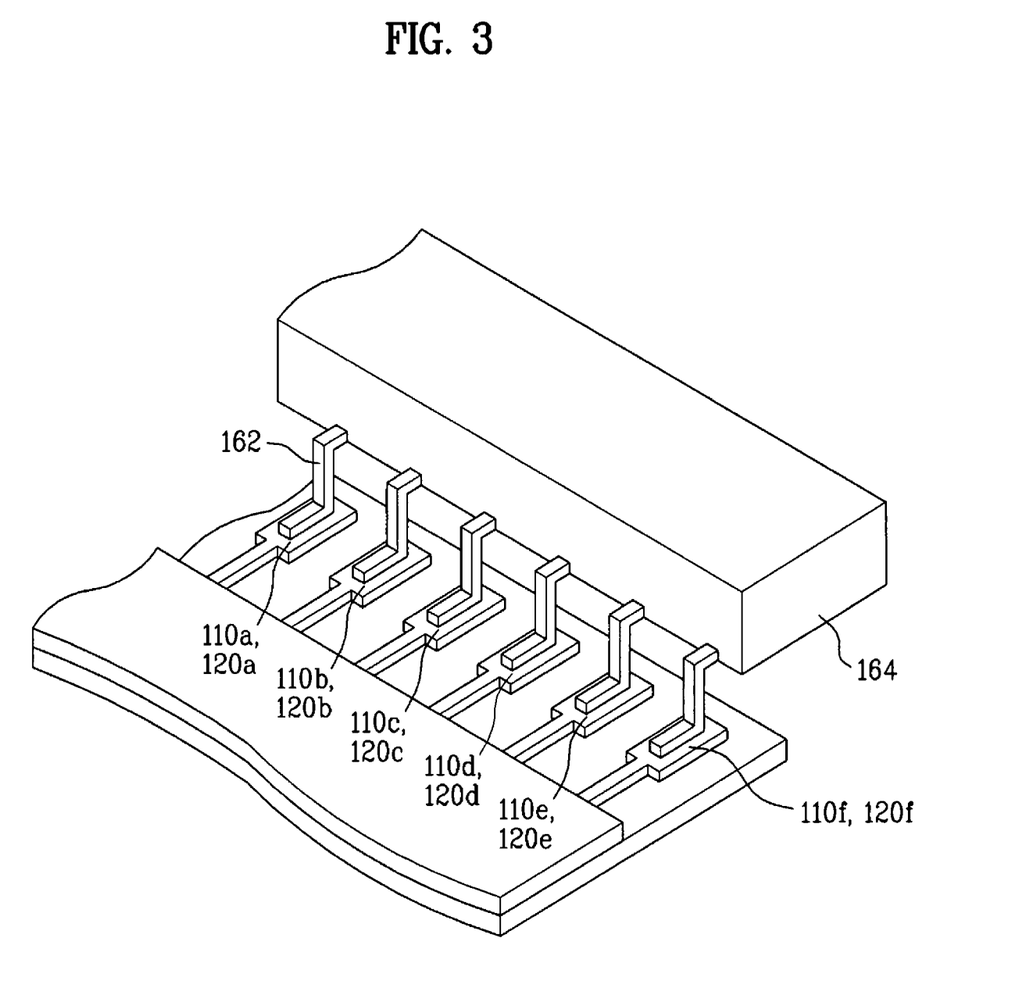
FIG. 3 is a perspective diagram of illustrating a probe pin to supply a test signal to a test pad shown in FIG. 1 or 2.

The test circuit unit 140 includes a first test transistor group SWR1, SWG1, SWB1 corresponding to the first block A1, and a second test transistor group SWR2, SWG2, SWB2 corresponding to the second block A2. The first and second test transistor groups SWR1, SWG1, SWB1, SWR2, SWG2, SWB2 include the R test transistors SWR1, SWR2 connected to the R data lines R11, R12, ..., R1n, R21, R22, ..., R2n corresponding to the liquid crystal cells to realize a red color; the G test transistors SWG1, SWG2 connected to the G data lines G11, G21, ..., G1n, G21, G22, ..., G2n corresponding to the liquid crystal cells to realize a green color; and the B test transistors SWB1, SWB2 connected to the B data lines B11, B21, ..., B1n, B21, B22, ..., B2n corresponding to the liquid crystal cells to realize a blue color. The R, G and B test transistors SWR, SWG, SWB are formed of poly-silicon or amorphous-silicon type thin film transistors which are identical to the thin film transistors TFTs positioned in the image display unit 130, as shown in FIG. 3.

The R test transistor SWR1, SWR2 includes a gate electrode connected to the R test control pad 110b, 120b and the test control line 144R; a source electrode connected to the R test data pad 110a, 120a and the test data line 142R; and a drain electrode connected the R data line R11, R12, ..., R1n, R21, R22, ..., R2n. Accordingly, the R test transistor SWR1, SWR2 supplies the test signal from the R test data pad 110a, 120a to the R data line R11, R12, ..., R1n, R21, R22, ..., R2n in response to the control signal supplied from the R test control pad 110b, 120b.

The G test transistor SWG1, SWG2 includes a gate electrode connected to the G test control pad 110d, 120d and the test control line 144G; a source electrode connected to the G test data pad 110c, 120c and the test data line 142G; and a drain electrode connected the G data line G11, G12, ..., G1n, G21, G22, ..., G2n. Accordingly, the G test transistor SWG1, SWG2 supplies the test signal from the G test data pad 110c, 120c to the G data line G11, G12, ..., G1n, G21, G22, ..., G2n in response to the control signal supplied from the G test control pad 110d, 120d.

The B test transistor SWB1, SWB2 includes a gate electrode connected to the B test control pad 110f, 120f and the test control line 144B; a source electrode connected to the B test data pad 110e, 120e and the test data line 142B; and a drain electrode connected the B data line B11, B12, ..., B1n, B21, B22, ..., B2n. Accordingly, the B test transistor SWB1, SWB2 supplies the test signal from the B test data pad 110e, 120e to the B data line B11, B12, ..., B1n, B21, B22, ..., B2n in response to the control signal supplied from the B test control pad 110f, 120f.

The liquid crystal display device according to the present invention tests the liquid crystal cells included in each block by using the test transistor group corresponding to each block. As testing the image display unit by the plurality of test transistor groups in the liquid crystal display device according to the present invention, the test data line and test control line connected to each test transistor group are decreased in their lengths as compared to those in case of testing the entire image display unit by using one test transistor group. Accordingly, it is possible to prevent the delay of test signal caused by resistant components included in the test control line and test data line, to thereby decrease the distortion of test signal.

Figure 4A:
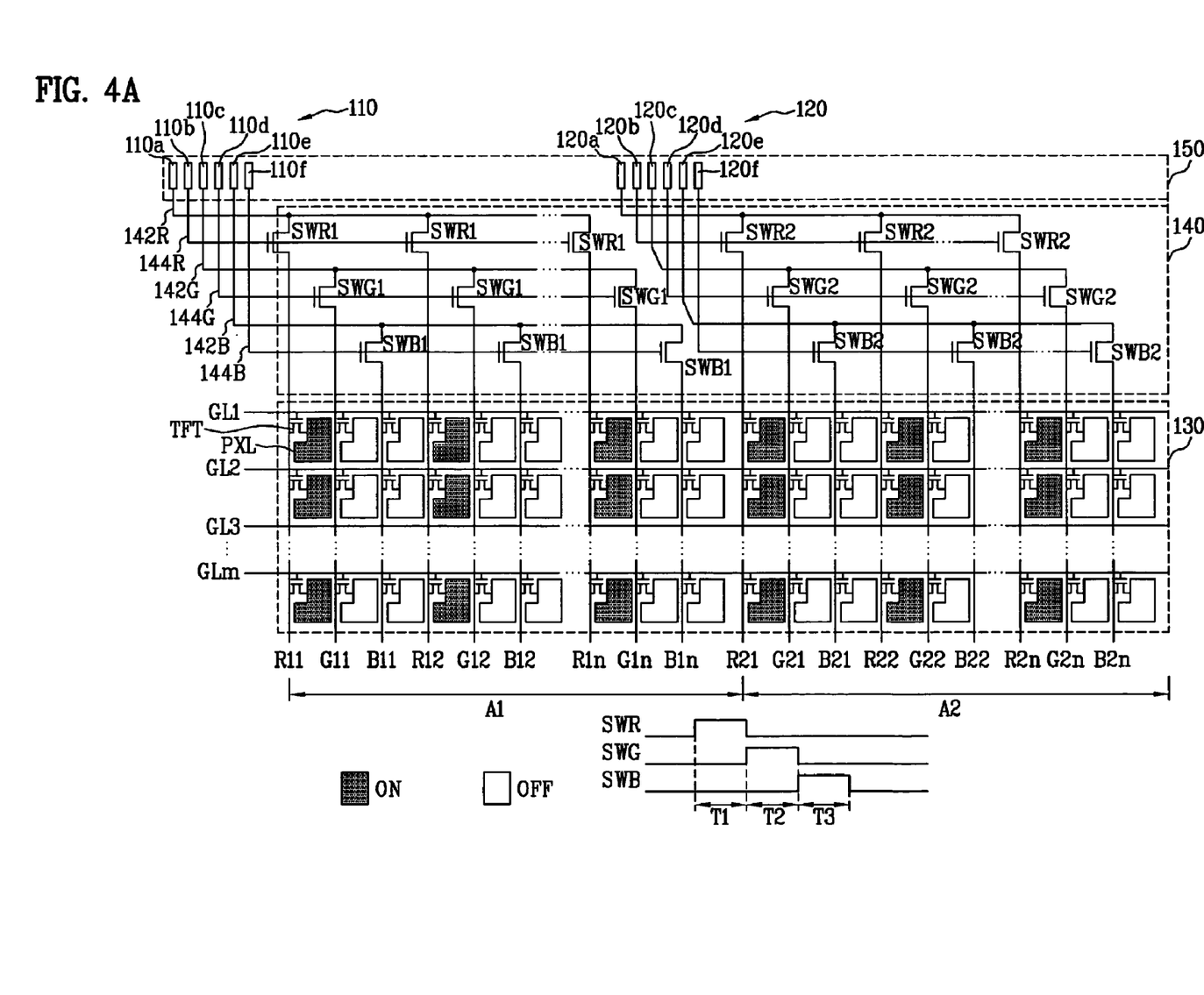
FIGS. 4A to 4C are diagrams of illustrating a testing method for a liquid crystal display device shown in FIG. 1.
Figure 4B:
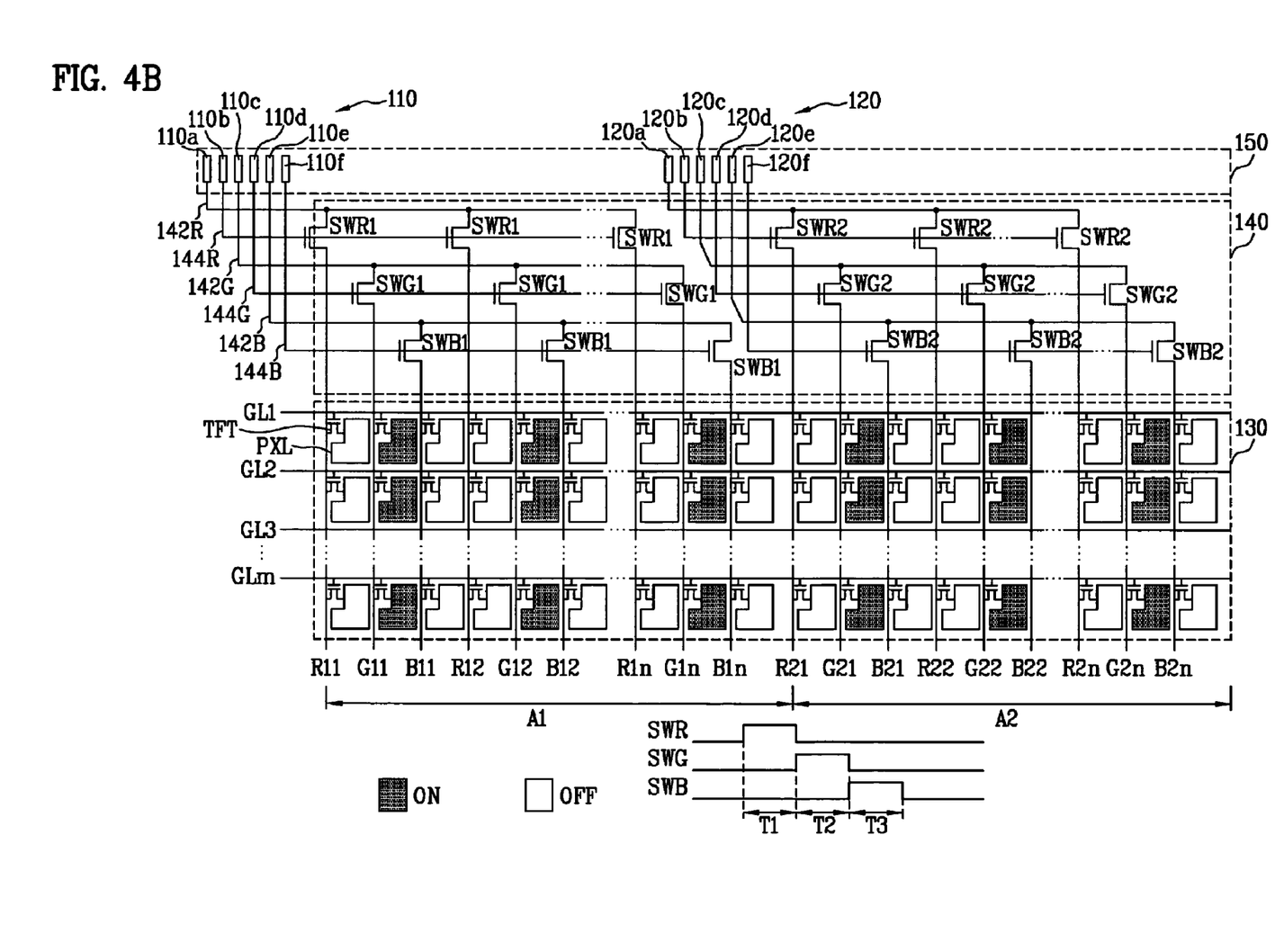
Figure 4C:
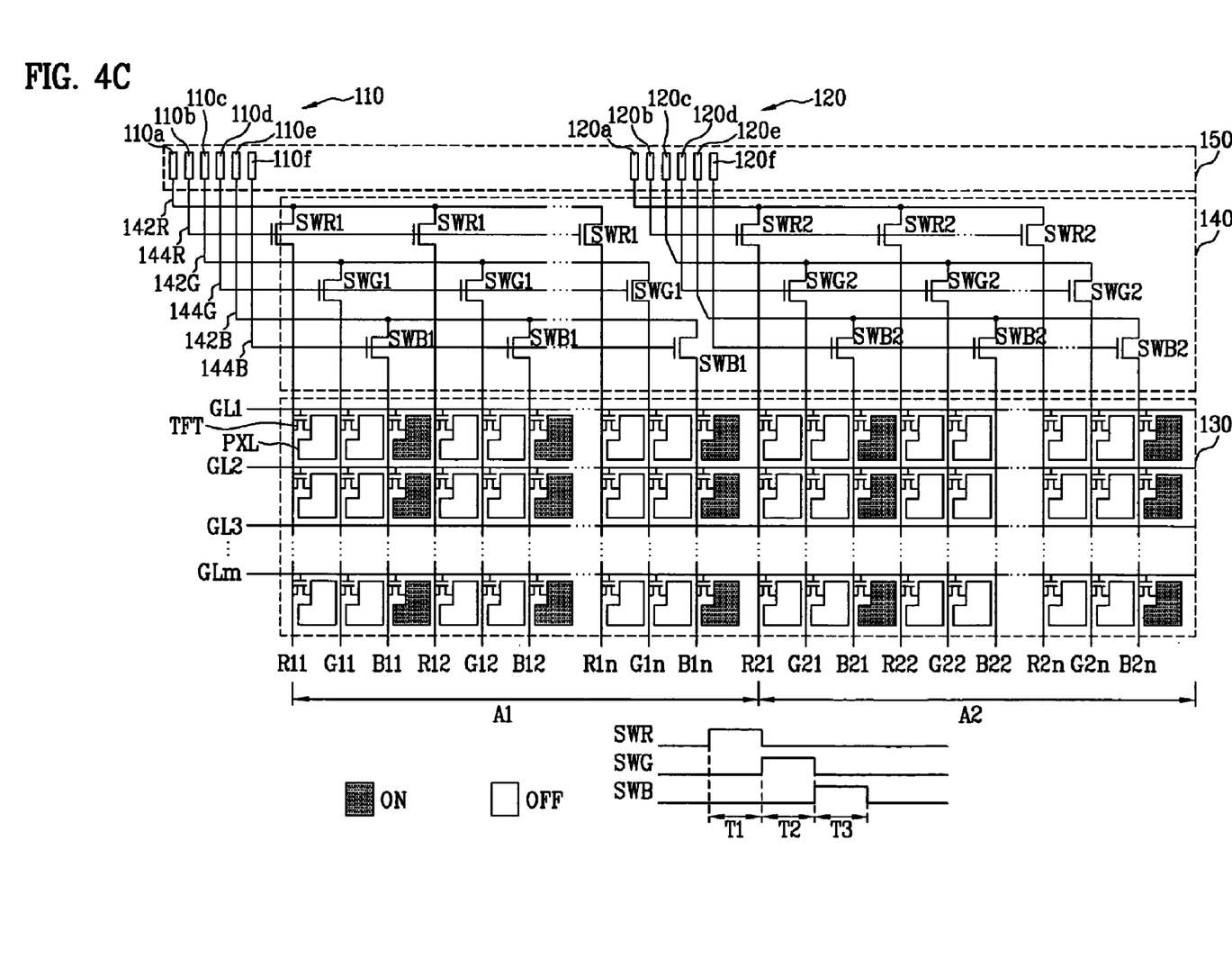

The testing process using the R, G and B test transistors SWR, SWG, SWB shown in FIG. 1 or 2 is explained with reference to FIGS. 4A to 4C.

During a first period T1, if the control signal from the R test control pad 110b, 120b is supplied to the gate electrode of the R test transistor SWR1, SWR2, the R test transistor SWR1, SWR2 is turned-on. Then, the turned-on R test transistor SWR1, SWR2 supplies the test signal of the R test data pad 110a, 120a supplied through the probe pin 162 to the R data line R11, R12, ..., R1n, R21, R22, ..., R2n. Through the thin film transistor TFT being turned-on, the test signal is supplied to the liquid crystal cells connected to the R data line R11, R12, ..., R1n, R21, R22, ..., R2n, as shown in FIG. 4A. Thereafter, a worker discriminates whether the image display unit is defective or not based on the displayed image through a test by unaided eyes or an automatic test using an optical device. If the image display unit is defective, the R liquid crystal cells connected to the defective signal line represent the different images from those displayed on the R liquid crystal cells connected to the normal signal line, so that it is possible to check the defectiveness in the R liquid crystal cells.

During a second period T2, if the control signal from the G test control pad 110d, 120d is supplied to the gate electrode of the G test transistor SWG1, SWG2, the G test transistor SWG1, SWG2 is turned-on. Then, the turned-on G test transistor SWG1, SWG2 supplies the test signal of the G test data pad 110c, 120c supplied through the probe pin 162 to the G data line G11, G12, ..., G1n, G21, G22, ..., G2n. Through the thin film transistor TFT being turned-on, the test signal is supplied to the liquid crystal cells connected to the G data line G11, G12, ..., G1n, G21, G22, ..., G2n, as shown in FIG. 4B. Thereafter, the worker discriminates whether the image display unit is defective or not based on the displayed image through the test by unaided eyes or the automatic test using the optical device. If the image display unit is defective, the G liquid crystal cells connected to the defective signal line represent the different images from those displayed on the G liquid crystal cells connected to the normal signal line, so that it is possible to check the defectiveness in the G liquid crystal cells.

During a second period T2, if the control signal from the G test control pad 110d, 120d is supplied to the gate electrode of the G test transistor SWG1, SWG2, the G test transistor SWG1, SWG2 is turned-on. Then, the turned-on G test transistor SWG1, SWG2 supplies the test signal of the G test data pad 110c, 120c supplied through the probe pin 162 to the G data line G11, G12, ..., G1n, G21, G22, ..., G2n. Through the thin film transistor TFT being turned-on, the test signal is supplied to the liquid crystal cells connected to the G data line G11, G12, ..., G1n, G21, G22, ..., G2n, as shown in FIG. 4B. Thereafter, the worker discriminates whether the image display unit is defective or not based on the displayed image through the test by unaided eyes or the automatic test using the optical device. If the image display unit is defective, the G liquid crystal cells connected to the defective signal line represent the different images from those displayed on the G liquid crystal cells connected to the normal signal line, so that it is possible to check the defectiveness in the G liquid crystal cells.

According as the test signal is separately supplied to the respective R, G and B liquid crystal cells, it is possible to separately carry out the test process for each of the R, G and B data lines in the liquid crystal display device according to the present invention.

As mentioned above, the liquid crystal display device according to the present invention and the testing method thereof have the following advantages.

As testing the image display unit by using the plurality of test transistor groups in the liquid crystal display device according to the present invention, the test data line and test control line connected to each test transistor group are decreased in their lengths as compared to those in case of testing the entire image display unit by using one test transistor group. Accordingly, it is possible to prevent the delay of test signal caused by resistant components included in the test control line and test data line, to thereby decrease the distortion of test signal. Especially, the liquid crystal display device according to the present invention and the testing method thereof can decrease the resistant components included in the test control line and test data line whose lengths are relatively increased with the trend of high resolution and the increase of size in liquid crystal display panel.

Also, the liquid crystal display device according to the present invention and the testing method thereof provide the structure where the R, G and B test data pads and the test control pad are connected to the probe pin by each block, so that it is possible to decrease the number of test pads connected to the probe pin as compared with that of the related art, thereby improving the reliability on testing process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   an image display unit divided into a plurality of blocks, each block having a plurality of liquid crystal cells;
   a plurality of test pad groups corresponding to the plurality of blocks, respectively;
   a plurality of test transistor groups to supply test signals supplied to the plurality of test pad groups to the plurality of liquid crystal cells,
   wherein the plurality of test transistor groups are formed of a plurality of test transistors to independently switch the corresponding liquid crystal cells divided for realizing the same color; and
   wherein a gate electrode of the plurality of test transistors connected to signal lines corresponding to the liquid crystal cells for realizing the same color of each of the blocks are commonly connected to same test control pad of the plurality of test pad groups.

2. The liquid crystal display device of claim 1, wherein the plurality of test transistor groups comprise:
   a plurality of first test transistors connected to signal lines corresponding to the liquid crystal cells for realizing a red color of each of the blocks;
   a plurality of second test transistors connected to signal lines corresponding to the liquid crystal cells for realizing a green color of each of the blocks; and
   a plurality of third test transistors connected to signal lines corresponding to the liquid crystal cells for realizing a blue color of each of the blocks.

3. The liquid crystal display device of claim 1, wherein the plurality of test pad groups comprise:
   a plurality of first test control pads commonly connected to gate electrodes of the first test transistors to supply test control signals to the first test transistors, respectively;
   a plurality of second test control pads commonly connected to gate electrodes of the second test transistors to supply test control signals to the second test transistors, respectively;
   a plurality of third test control pads commonly connected to gate electrodes of the third test transistors to supply test control signals to the third test transistors, respectively; and
   first to third test data pads to supply test data signals to source electrodes of the first to third test transistors, respectively.

4. The liquid crystal display device of claim 3, further comprising:
   first to third test control lines to connect the first to third test transistors with the first to third test control pads, respectively, by each of the blocks; and
   first to third test data lines to connect the first to third test transistors with the first to third test data pads, respectively, by each of the blocks.

5. The liquid crystal display device of claim 1, wherein signal pads connected to the signal lines in the image display unit are formed at one side of the image display unit, and the plurality of test pad groups are formed at the other side of the image display unit.

6. A testing method of liquid crystal display device comprising:
   preparing a liquid crystal display device including an image display unit divided into a plurality of blocks, a plurality of test pad groups corresponding to the plurality of blocks respectively, and a plurality of test transistor groups to supply test signals supplied to the plurality of test pad groups to a plurality of liquid crystal cells;
   supplying the corresponding test signals to the plurality of test pad groups; and
   testing whether the liquid crystal cells are defective or not with the use of the plurality of test transistor groups respectively connected to the plurality of test pad groups,
   wherein testing whether the liquid crystal cells are defective or not comprises performing a test using the plurality of test transistor groups comprised of a plurality of test transistors to independently switch the corresponding liquid crystal cells divided for realizing the same color; and
   wherein gate electrodes of the plurality of test transistors connected to signal lines corresponding to the liquid crystal cells for realizing the same color of each of the blocks are commonly connected to same test control pad of the plurality of test pad groups.

7. The testing method of claim 6, wherein testing whether the liquid crystal cells are defective or not comprises:
   checking whether the liquid crystal cells for realizing a red color of each of the blocks are defective or not by using a plurality of first test transistors included in each of the plurality of test transistor groups;
   checking whether the liquid crystal cells for realizing a green color of each of the blocks are defective or not by using a plurality of second test transistors included in each of the plurality of test transistor groups; and
   checking whether the liquid crystal cells for realizing a blue color of each of the blocks are defective or not by using a plurality of third test transistors included in each of the plurality of test transistor groups.

8. The testing method of claim 7, wherein checking whether the liquid crystal cells for realizing the red color of each of the blocks are defective or not comprises:
   supplying a test control signal to gate electrodes of the first test transistor through a first test control pad and a first test control line formed by each of the blocks, wherein the gate electrodes of the first test transistors are commonly connected the first test control pad; and
   supplying a test data signal to source electrodes of the first test transistor through a first test data pad and a first test data line formed by each of the blocks.

9. The testing method of claim 8, wherein checking whether the liquid crystal cells for realizing the green color of each of the blocks are defective or not comprises:
   supplying a test control signal to gate electrodes of the second test transistor through a second test control pad and a second test control line formed by each of the blocks, wherein the gate electrodes of the second test transistors are commonly connected the second test control pad; and supplying a test data signal to source electrodes of the second test transistor through a second test data pad and a second test data line formed by each of the blocks.

10. The testing method of claim 9, wherein checking whether the liquid crystal cells for realizing the blue color of each of the blocks are defective or not comprises:

supplying a test control signal to gate electrodes of the third test transistor through a third test control pad and a third test control line formed by each of the blocks, wherein the gate electrodes of the third test transistors are commonly connected the third test control pad; and supplying a test data signal to source electrodes of the third test transistor through a third test data pad and a third test data line formed by each of the blocks.

* * * * *